Oct. 11, 1938. S. E. FRITSCHE 2,133,166
INDIVIDUAL COFFEE OR TEA BAG AND SEPARATE COVER
Filed Feb. 7, 1938

INVENTOR
Susanne E. Fritsche
BY
ATTORNEY

UNITED STATES PATENT OFFICE 2,133,166

INDIVIDUAL COFFEE OR TEA BAG AND SEPARATE COVER

Susanne E. Fritsche, St. George, Staten Island, N. Y.

Application February 7, 1938, Serial No. 189,089

8 Claims. (Cl. 53—3.5)

This invention relates to new and useful improvements in an individual coffee or tea bag and separate cover.

More specifically the invention proposes the construction of an individual coffee or tea bag characterized by a pervious container for holding a small quantity of tea or coffee and having an open side adapted to be closed by a pervious cover.

Still further it is proposed to provide the cover with a rigid handle by which the entire device may be dipped into a liquid for flavoring the same.

Still further it is proposed to attach a perforated disc to the pervious cover in such a manner that the openings in the disc may be aligned or disaligned with the openings in the cover for controlling the passage of the liquid therethrough.

Another object of this invention is to provide a disc upon the cover which may be used for extending across the openings therein when desired for limiting the passage of the liquid therethrough.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
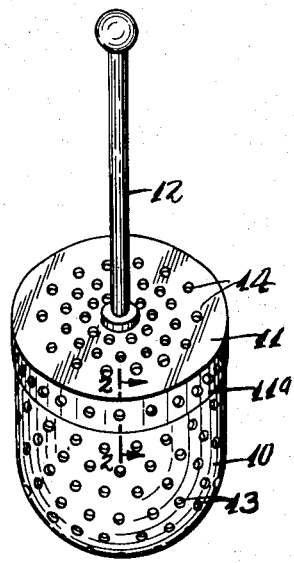
Fig. 1 is a perspective view of an individual coffee or tea bag having a separate cover according to this invention.

The individual coffee or tea bag and separate cover, according to this invention, comprises a pervious container 10 for holding a small quantity of tea or coffee with or without the customary small holding bag, and having an open top 10ª. A pervious cover 11 is detachably mounted on the open top of the container 10 for closing the said open top. A handle 12 is rigidly mounted on the cover 11 and serves as a means for facilitating the dipping of the container into a liquid.

The pervious container 10 is formed from a piece of aluminum or other sheet metal bent into the desired shape and having a plurality of perforations 13 stamped therein and through which the liquid is adapted to pass. The pervious cover is also provided with a plurality of openings 14 and is also constructed from a piece of aluminum or other sheet material stamped into the desired shape. The edge portion of the cover 11 is provided with a depending flange 11ª. The adjacent faces of the depending flange and the container 10 have threads 15 for releasably holding the cover 11 in position across the open top 10ª of the container 10.

Figure 2:
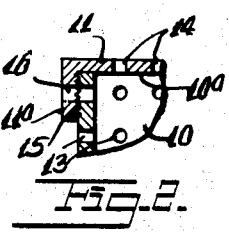
Fig. 2 is an enlarged sectional view taken on the line 2—2 of Fig. 1.

The adjacent faces of the flange 11ª and the container 10 are provided with perforations 16 which are adapted to be aligned with each other in the position in which the cover 11 is properly attached to the container 10 to also permit the liquid to pass therethrough (see Fig. 2).

The operation of this device is as follows:—

The pervious cover 11 is removed from the container 10 by disengaging the threads 15 and a small amount of coffee or tea, with or without the customary small holding bag, is inserted into the container 10. The cover 11 is again engaged across the open top 10ª of the container. For dipping the container into the liquid the handle 12 is grasped between the fingers and the entire container is dipped in and out of the liquid several times for flavoring the same as coffee or tea, depending upon which flavoring material is within the container.

Figure 4:
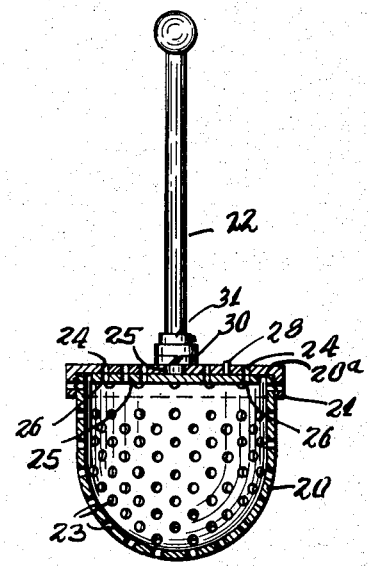
Fig. 4 is an enlarged sectional view taken on the line 4—4 of Fig. 3.
Figure 3:
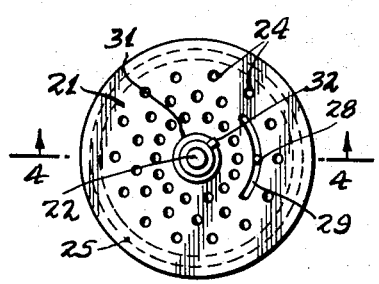
Fig. 3 is a plan view of a coffee or tea bag constructed according to a modification of the invention.

According to the modification shown in Figs. 3 and 4 the container 20 is provided with an open top 20ª and a cover 21 is adapted to be extended across the open end 20ª of the container 20. A handle 22 is attached to the top face of the cover 21 for facilitating the dipping of the container in the liquid which is to be flavored. The container 20 is formed from perforated aluminum or other sheet metal and has perforations 23. The cover 21 is also formed from aluminum or other sheet metal and has a plurality of perforations 24. A means is provided for controlling the opening and closing of the perforations 24 in the cover 21. This means consists of a disc 25 extending across the bottom face of the cover 21 and being formed with a plurality of openings 26 which are adapted to be aligned or disaligned with the openings 24.

This disc 25 is fixedly attached to the bottom end of the handle 22 which rotatively passes through an opening 27 in the cover 21. A pin 28 on the disc 25 extends through an arcuate slot 29 in the cover 21 for limiting the pivoting of the disc to positions in which the openings 24 and 26 will either be aligned or disaligned. A means is provided for resiliently urging the disc 25 against the bottom face of the cover 21 and consists of a split washer 30 which operates between the top face of the cover 21 and a collar 31 which is adjustably mounted upon the handle 22. A set screw 32 engages through the collar 31 and abuts against the handle 22 for holding the collar 31 in various adjusted positions on the handle 22. In other respects this form of the invention is similar to the previous form.

Figure 5:
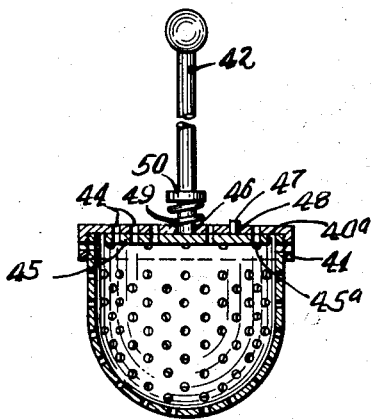
Fig. 5 is a view of a still further modification of the invention.
Figure 6:
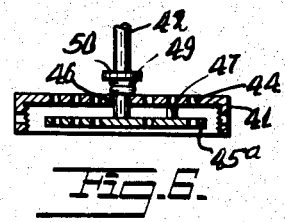
Fig. 6 is a view similar to a portion of Fig. 5 but illustrating a different position of the parts.

According to the modification shown in Figs. 5 and 6, a pervious container 40 constructed of aluminum or other sheet metal is provided with a plurality of openings 43 and has an open end 40ᵃ. A cover 41 also constructed of sheet metal is provided with a plurality of openings 44 and is adapted to extend across the open end 40ᵃ of the container 40. A handle 42 is attached to the cover 41 for facilitating the dipping of the container into the liquid. A disc 45 is attached to the handle 42 and is adapted to be spaced from the cover 41 to act as a stirrer for the liquid. This disc 45 has a plurality of openings 45ᵃ aligned with the openings 44 and is fixedly attached to the bottom end of the handle 42 which freely passes through an opening 46 formed in the cover 41. A peg 47 is adapted to engage a slot 48 formed in the cover 41 for permitting the top face of the disc 45 to lay immediately adjacent the bottom face of the cover 41 for aligning the openings 44 formed in the cover 41 with the openings 45ᵃ.

This peg 47 may be disengaged from the slot 48 and the disc rotated slightly to a position in which the top end of the peg 47 will abut against the bottom face of the cover 41 around the slot 48 for holding the disc 45 spaced from the bottom face of the cover 41. A means is provided for resiliently urging the disc 45 against the bottom face of the cover 41. This means comprises a spring 49 which operates between the top face of the cover 41 and a collar 50 mounted on the handle 42. This spring 49 normally tends to urge the collar 50 away from the top face of the cover 41 for urging the disc 45 against the bottom face of the cover 41.

Figure 7:
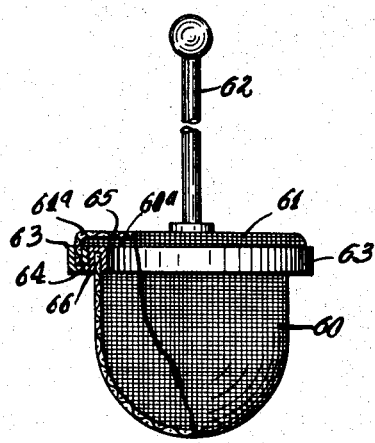
Fig. 7 is an elevational view of a still further modification of the invention.

According to the modification shown in Fig. 7, the container 60 is constructed of wire mesh material. A handle 62 is attached to the top face of the cover 61 for facilitating the dipping of the container into a liquid. The cover 61 is formed with a depending flange 61ᵃ which is provided with an annular ring 63 securely attached thereto and which is provided with threads 64. The top end of the container 60 is also provided with an annular ring 65 which is formed with threads 66 which are adapted to be engaged with the threads 64 of the ring 63 for securely holding the cover 61 in position upon the open end 60ᵃ of the container 60.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. An individual coffee or tea bag and separate cover comprising a pervious container for holding a small quantity of tea or coffee with or without the customary small holding bag and having an open top, a perforated cover for detachable mounting on said container for closing said open top and having a perforated top wall, a handle extending axially of said top wall and turnably mounted at its bottom end through said top wall, and a perforated disc attached upon the inner end of said handle and in face contact with the inner face of said top wall for controlling the passage of fluid through said perforations.

2. An individual coffee or tea bag and separate cover comprising a pervious container for holding a small quantity of tea or coffee with or without the customary small holding bag and having an open top, a perforated cover for detachable mounting on said container for closing said open top and having a perforated top wall, a handle extending axially of said top wall and turnably mounted at its bottom end through said top wall, and a perforated disc attached upon the inner end of said handle and in face contact with the inner face of said top wall for controlling the passage of fluid through said perforations, and resilient means acting between said handle and said cover for urging said disc against said top wall comprising a collar attached to a portion of said handle, and a split washer acting between the top face of said cover and said collar for urging said disc against said cover.

3. An individual coffee or tea bag and separate cover comprising a pervious container for holding a small quantity of tea or coffee with or without the customary small holding bag and having an open top, a perforated cover for detachable mounting on said container for closing said open top and having a perforated top wall, a handle extending axially of said top wall and turnably mounted at its bottom end through said top wall, and a perforated disc attached upon the inner end of said handle and in face contact with the inner face of said top wall for controlling the passage of fluid through said perforations, and means for limiting the pivoting of said handle to positions in which the perforations in said disc will be either aligned or disalined with the perforations in said cover.

4. An individual coffee or tea bag and separate cover comprising a pervious container for holding a small quantity of tea or coffee with or without the customary small holding bag and having an open top, a perforated cover for detachable mounting on said container for closing said open top and having a perforated top wall, a handle extending axially of said top wall and turnably mounted at its bottom end through said top wall, and a perforated disc attached upon the inner end of said handle and in face contact with the inner face of said top wall for controlling the passage of fluid through said perforations, and means for limiting the pivoting of said handle to positions in which the perforations in said disc will be either aligned or disaligned with the perforations in said cover, said means comprising a peg extending from the top face of said disc and working in an arcuate slot formed in said cover for limiting the pivoting thereof.

5. An individual coffee or tea bag and separate cover comprising a pervious container for holding a small quantity of tea or coffee with or without the customary small holding bag and having an open top, a perforated cover for detachable mounting on said container for closing open top and having a perforated top wall, a handle extending axially of said top wall and turnably mounted at its bottom end through said top wall, and a perforated disc attached upon the inner end of said handle and in face contact with the inner face of said top wall for controlling the passage of fluid through said perforations, and means for limiting the pivoting of said handle to positions in which the perforations in said disc will be either aligned or disaligned with the perforations in said cover, said means comprising a peg extending from the top face of said disc and working in an arcuate slot formed in said cover for limiting the pivoting thereof, said resilient means being compressible so that said handle may be moved axially to slightly space said disc from said top wall.

6. An individual coffee or tea bag and separate cover comprising a pervious container for holding a small quantity of tea or coffee with or without the customary small holding bag and having an open top, a perforated cover for detachable mounting on said container for closing said open top and having a perforated top wall, a handle extending axially of said top wall and turnably mounted at its bottom end through said top wall, and a perforated disc attached upon the inner end of said handle and in face contact with the inner face of said top wall for controlling the passage of fluid through said perforations, and means for limiting the pivoting of said handle to positions in which the perforations in said disc will be either aligned or disaligned with the perforations in said cover, said means comprising a peg extending from the top face of said disc and working in an arcuate slot formed in said cover for limiting the pivoting thereof, and said handle being turnable to remove said pin from said slot for engaging beneath the top wall for holding said disc in its spaced positions.

7. In an individual coffee or tea bag, a perforated cover for extending across an open top of a pervious container, a handle extending axially from said cover and having its bottom end turnably mounted through said cover, a perforated disc attached to the bottom end of said handle and extending parallel to said cover, said perforations in said disc being in aligned positions with the perforations in said cover, resilient means urging said handle into a position in which said disc and said cover are in face contact and leaving said handle free to be turned to correspondingly turn said disc to align or disalign the perforations in said disc and cover to control the passage of liquid therethrough, and a peg on said disc engaging an arcuate slot formed in said cover for limiting the rotation of said handle to positions in which the perforations in said disc will be either in line with or out of line with relation to the perforations in said cover.

8. In an individual coffee or tea bag, a perforated cover for extending across an open top of a pervious container, a handle extending axially from said cover and having its bottom end turnably mounted through said cover, a perforated disc attached to the bottom end of said handle and extending parallel to said cover, said perforations in said disc being in aligned positions with the perforations in said cover, resilient means urging said handle into a position in which said disc and said cover are in face contact and leaving said handle free to be turned to correspondingly turn said disc to align or disalign the perforations in said disc and cover to control the passage of liquid therethrough, and a peg on said disc engaging an arcuated slot formed in said cover for limiting the rotation of said handle to positions in which the perforations in said disc will be either in line with or out of line with relation to the perforations in said cover, said resilient means, comprising a collar mounted on said handle, and an expansion member on said handle and operating between said cover and said collar to urge said handle into its axially extended position.

SUSANNE E. FRITSCHE.